US012692368B2

(12) United States Patent
Burckhardt et al.

(10) Patent No.: US 12,692,368 B2
(45) Date of Patent: Jul. 28, 2026

(54) CYCLOALIPHATIC ALDIMINE MIXTURE

(71) Applicant: SIKA TECHNOLOGY AG, Baar (CH)

(72) Inventors: Urs Burckhardt, Zürich (CH); Andreas Kramer, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 764 days.

(21) Appl. No.: 18/023,509

(22) PCT Filed: Oct. 18, 2021

(86) PCT No.: PCT/EP2021/078817
§ 371 (c)(1),
(2) Date: Feb. 27, 2023

(87) PCT Pub. No.: WO2022/084254
PCT Pub. Date: Apr. 28, 2022

(65) Prior Publication Data

US 2023/0312875 A1 Oct. 5, 2023

(30) Foreign Application Priority Data

Oct. 19, 2020 (EP) .................................... 20202653

(51) Int. Cl.

| | |
|---|---|
| ***C08K 5/29*** | (2006.01) |
| ***C08G 18/12*** | (2006.01) |
| ***C08G 18/48*** | (2006.01) |
| ***C08G 18/75*** | (2006.01) |
| ***C09D 7/40*** | (2018.01) |
| ***C09D 7/61*** | (2018.01) |
| ***C09D 7/63*** | (2018.01) |
| ***C09D 175/08*** | (2006.01) |
| ***C09J 11/06*** | (2006.01) |
| ***C09J 175/08*** | (2006.01) |

(52) U.S. Cl.
CPC ................ *C08K 5/29* (2013.01); *C08G 18/12* (2013.01); *C08G 18/4812* (2013.01); *C08G 18/4825* (2013.01); *C08G 18/4829* (2013.01); *C08G 18/755* (2013.01); *C09D 7/61* (2018.01); *C09D 7/63* (2018.01); *C09D 7/70* (2018.01); *C09D 175/08* (2013.01); *C09J 11/06* (2013.01); *C09J 175/08* (2013.01)

(58) Field of Classification Search
None
See application file for complete search history.

(56) References Cited

U.S. PATENT DOCUMENTS

| | | | |
|---|---|---|---|
| 4,020,104 | A | 4/1977 | Richter |
| 5,466,771 | A | 11/1995 | Hicks et al. |
| 5,516,873 | A | 5/1996 | Hicks et al. |
| 2021/0309787 | A1 | 10/2021 | Schlumpf et al. |

FOREIGN PATENT DOCUMENTS

| | | | |
|---|---|---|---|
| CN | 101675087 | A | 3/2010 |
| DE | 33 06 373 | A1 | 8/1984 |
| DE | 43 34 790 | A1 | 4/1995 |
| EP | 2 132 247 | B1 | 1/2020 |
| JP | 2010-522789 | A | 7/2010 |
| WO | 2020/030607 | A1 | 2/2020 |

OTHER PUBLICATIONS

Jan. 20, 2022 International Search Report issued in International Patent Application No. PCT/EP2021/078817.
Jan. 20, 2022 Written Opinion issued in International Patent Application No. PCT/EP2021/078817.

*Primary Examiner* — Yun Qian
(74) *Attorney, Agent, or Firm* — Oliff PLC

(57) ABSTRACT

A mixture of isomeric aldimines of the formulae (Ia), (Ib) and (Ic) in which the ratio of the trans,trans isomer (Ia) to the sum of the cis,trans isomer (Ib) and the cis,cis isomer (Ic) is in the range of 5/95 to 30/70, and its use as latent hardener for moisture-curing isocyanate-functional polyurethane compositions. The inventive mixture of isomeric aldimines enables polyurethane compositions with very low content of monomeric isophorone diisocyanate and excellent stability under outdoor wheathering conditions and high UV load, which cure quickly to an elastic material of low surface tack and good mechanical properties, particularly in terms of high tensile strength and modulus of elasticity at high elongation. Such compositions are particularly suitable as elastic adhesives and/or sealants or elastic coatings, particularly for outdoor use such as on roofs, floors or ships.

14 Claims, No Drawings

CYCLOALIPHATIC ALDIMINE MIXTURE

TECHNICAL FIELD

Aldimines and their use as latent hardeners for moisture-curing polyurethanes, particularly for coatings, sealants and adhesives.

STATE OF THE ART

Aldimines and their use in moisture-curing polyurethane compositions are well known. The aldimines serve as so-called latent hardeners or blocked amines. They react with isocyanate groups upon contact with moisture and improve the curing properties of moisture-curing polyurethane compositions, in particular by preventing bubble formation caused by excessive release of carbon dioxide from the reaction of water with isocyanate groups. Particularly suitable are aldimines which are liquid at room temperature, as they enable an easy handling without solvents. In outdoor coating, sealing and bonding applications, moisture-curing polyurethane compositions typically contain isocyanate-functional polymers based on aliphatic diisocyanates, in particular the cycloaliphatic isophorone diisocyanate, as these provide particularly good UV resistance. When combined with latent hardeners, such compositions cure quickly to form elastic materials. However, they often remain somewhat tacky at the surface and/or have limited mechanical performance regarding tensile strength and modulus of elasticity, making them prone to dirt pickup and/or degradation under outdoor weathering conditions, such as ponding water and UV exposure. These effects are particularly pronounced for compositions with a relatively low isocyanate content, such as low modulus sealants and adhesives, or coatings based on monomer-reduced polymers. Monomeric isophorone diisocyanate, like other small isocyanates, is a toxic and volatile molecule presenting a potential health risk for the applicators. It is therefore advantageous from an EH&S point of view to remove it from the isocyanate-functional polymer, e.g. by distillation.

The negative effects of the low isocyanate content may be mitigated by the addition of non-monomeric isocyanates, for example isophorone diisocyanate oligomers, but these, however, act as crosslinkers leading to an unwanted stiffening of the cured composition with loss of elongation.

EP 2,132,247 reveals polyurethane compositions based on cycloaliphatic isocyanates and cycloaliphatic dialdimines from polyamines and ether- or ester-aldehydes; the example Dialdimine A-4 is derived from solid bis(4-aminocyclohexyl)methane. U.S. Pat. No. 5,466,771 describes coating compositions based on allophanate-containing polyisocyanate oligomers and aldimines from polyamines and aliphatic aldehydes; the example Aldimine 1 is derived from bis(4-aminocyclohexyl)methane. These aldimines are unspecified with regard to their isomer composition. U.S. Pat. No. 4,020,104 and DE 4,334,790 describe a process to obtain and separate the target molecule trans,trans-bis(4-aminocyclohexyl)methane from its cis,trans- and cis,cis-isomers via isomerization and cristallization of the corresponding benzaldimines, followed by hydrolysation. The pure trans,trans-4,4'-di(benzylideneamino)dicyclohexylmethane has a high melting point of 148 to 150° C.

SUMMARY OF THE INVENTION

The task of this invention is to overcome the drawbacks of state-of-the-art elastic moisture-curing polyurethane compositions, especially those with a low isocyanate content, in particular a low content of monomeric isophorone diisocyanate, in terms of limited mechanical properties, in particular tensile strength, elongation and/or modulus of elasticity.

Surprisingly this task is achieved by a mixture of isomeric cycloaliphatic aldimines of the formulae (Ia), (Ib) and (Ic), in which the ratio of the trans,trans isomer (Ia) to the sum of the cis,trans isomer (Ib) and the cis,cis isomer (Ic) is in the range of 5/95 to 30/70, as described in claim 1. The inventive mixture of aldimines is particularly easy to manufacture and process without requiring a melting step or the use of solvents, as the cycloaliphatic amine mixture from which the aldimine is derived, and the aldimine mixture itself, are liquid at room temperature. In contrast to this, any mixture of the isomeric benzaldimines of bis(4-aminocyclohexyl)methane is solid at room temperature with a high melting temperature. The inventive mixture of isomeric aldimines affords an improved mechanical strength to elastic coatings, sealants or adhesives, especially those based on isophorone diisocyanate. Surprisingly, the tensile strength and/or modulus of elasticity obtained with the inventive mixture of isomeric aldimines are significantly higher than for the same isomeric aldimines in a different isomer ratio, with a higher content of the trans,trans isomer of the formula (Ia). This is most surprising, as one would expect the symmetric and geometrically stretched trans,trans isomer to provide polymers with higher strength due to particularly strong hard segment stacking. The inventive mixture of isomeric aldimines enables to formulate isophorone diisocyanate based moisture-curing polyurethane compositions with a content of monomeric isophorone diisocyanate below 0.1 weight-%, which cure to form elastic materials with low surface tack and good mechanical strength at very high elongation at break. Such compositions are particularly suitable for applications which are exposed to outdoor wheathering conditions, such as elastic coatings for outdoor floors or roofs, or elastic adhesives or sealants for applications with heavy UV load, for example joint sealants on high rise façades or deck caulks on ships and boats.

The inventive mixture of isomeric aldimines has further beneficial properties. It shows a good shelf life stability in isocyanate-functional compositions and enables low viscous compositions which are easy to apply and have sufficient open time to allow precise positioning and large surface applications. Nevertheless, the curing process proceeds quickly, whereby the compositions soon become largely tack-free and show a fast build-up of mechanical strength and elasticity.

Other aspects of the invention are described in other independent claims. Preferred aspects of the invention are described in dependent claims.

DETAILED DESCRIPTION OF THE INVENTION

The subject of the invention is a mixture of isomeric aldimines of the formulae (Ia), (Ib) and (Ic), (Ia)

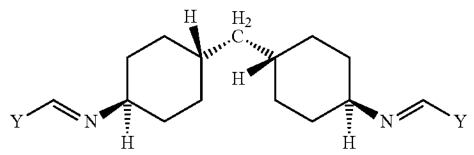

-continued (Ib)

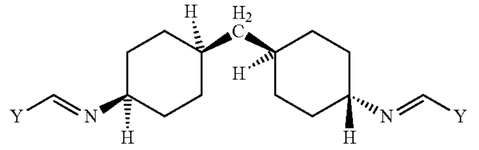

(Ic)

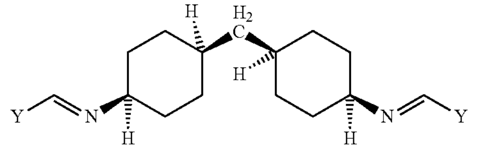

wherein each Y independently is a monovalent linear or branched $C_3$ to $C_{20}$ alkyl or cycloalkyl or arylalkyl group optionally containing ether, ester, tertiary amine, amide, urethane and/or urea groups, characterized in that the ratio of the trans,trans isomer (Ia) to the sum of the cis,trans isomer (Ib) and the cis,cis isomer (Ic) is in the range of 5/95 to 30/70.

In this document, the term "moisture-curing" refers to a composition, which cures when exposed to moisture.

In this document, the terms "shelf life stability" and "storage stability" refer to the ability of a composition to be stored at room temperature in a suitable container under exclusion of moisture for a certain time interval, in particular several months, without undergoing significant changes in application or end-use properties.

In this document, the term "molecular weight" refers to the molar mass (g/mol) of a molecule or a moiety of a molecule. The term "average molecular weight" refers to the number average molecular weight ($M_n$) of an oligomeric or polymeric mixture of molecules or moieties of molecules. It is determined by means of gel permeation chromatography (GPC) against polystyrene as the standard, particularly with tetrahydrofuran as the mobile phase and a refractive index detector.

In this document, the term "NCO-content" refers to the content of isocyanate groups in weight-%.

In this document, the term "weight-%" refers to the mass fraction of a constituent of a composition based on the entire composition, unless stated otherwise. The terms "weight" and "mass" are used synonymously in this document.

In this document, "room temperature" refers to a temperature of 23° C.

All industry standards and norms mentioned in this document refer to the versions valid at the time of filing the first application.

Preferred is a mixture of isomeric aldimines, wherein the ratio of the trans,trans isomer (Ia) to the sum of the cis,trans isomer (Ib) and the cis,cis isomer (Ic) is in the range of 15/85 to 25/75.

Such a mixture is easy available from a 4,4'-methylene-bis(cyclohexylamine) isomer mixture with a content of the trans,trans isomer in the range of 15 to 25%, which is liquid at room temperature and is commercially available, for example as Amicure® PACM or Vestamin® PACM (from Evonik) or Wanamine® $H_{12}$MDA (from Wanhua Chem.).

Preferably Y is a branched $C_3$ to $C_7$ alkyl, more preferably isopropyl or hept-3-yl, particularly isopropyl. Such a mixture of isomeric aldimines is well accessible starting from commodity aldehydes and particularly cost-effective, and it enables moisture-curing polyurethane compositions with particularly fast curing properties.

More preferably, Y is a moiety of the formula (II), (II)

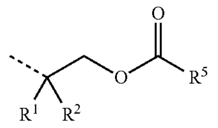

wherein $R^1$ and $R^2$ are the same or different $C_1$ to $C_4$ alkyls, or are joined together to form a $C_4$ to $C_6$ alkylene, and $R^5$ is H or a $C_1$ to $C_{17}$ alkyl optionally containing one or more ether groups.

Such a mixture of isomeric aldimines has low odour and enables moisture-curing polyurethane compositions with particularly good storage stability, also when these are based on highly reactive aromatic isocyanates such as diphenylmethane diisocyanate (MDI) or toluene diisocyanate (TDI).

Preferably, $R^1$ and $R^2$ are both methyl.

Preferably, $R^5$ is methyl, ethyl, pentyl, heptyl, nonyl or undecyl.

Most preferably, $R^1$ and $R^2$ are both methyl and $R^5$ is methyl or undecyl. Such a mixture of isomeric aldimines is well accessible starting from cost-effective aldehydes obtained from the esterification of hydroxypivalaldehyde with carbonic acids such as acetic acid or lauric acid. With $R^5$=methyl, it enables a particularly high modulus of elasticity and a particularly dry surface after cure. With $R^5$=undecyl, it enables compositions with a particularly low odour.

Most preferred, Y is a moiety of the formula (III), (III)

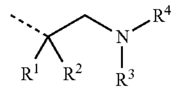

wherein $R^1$ and $R^2$ are the same or different $C_1$ to $C_4$ alkyls, or are joined together to form a $C_4$ to $C_6$ alkylene, and $R^3$ and $R^4$ are the same or different $C_1$ to $C_8$ alkyls optionally containing ether oxygen, or are joined together to form a $C_4$ to $C_6$ alkylene optionally containing ether oxygen.

Such a mixture of isomeric aldimines enables moisture-curing polyurethane compositions with low odour and fast curing properties. It is particularly suited for use in compositions which are primarily based on cycloaliphatic isocyanates such as isophorone diisocyanate (IPDI) or perhydro-4,4'- or 2,4'-diphenylmethane diisocyanate ($H_{12}$MDI or HMDI).

Preferably, $R^1$ and $R^2$ are both methyl.

Preferably, $R^3$ and $R^4$ are either both a methoxyethyl group, or are joined together to form a 3-oxa-1,5-pentylen or a 2,4-dimethyl-3-oxa-1,5-pentylene group, which forms together with the nitrogen atom, to which $R^3$ and $R^4$ are bonded, a morpholine or a 2,6-dimethylmorpholine ring.

Most preferably, $R^3$ and $R^4$ are joined together to form a 3-oxa-1,5-pentylen group, which is part of a morpholine ring.

Most preferably, $R^1$ and $R^2$ are both methyl and $R^3$ and $R^4$ are joined together to form a 3-oxa-1,5-pentylen group, which is part of a morpholine ring. This mixture of isomeric aldimines is liquid at room temperature, which enables particularly easy manufacture and processing. It has particularly low odour and enables moisture-curing polyurethane compositions which are primarily based on cycloaliphatic isocyanates with particularly good shelf life stability, fast curing and high mechanical strength and elasticity.

Preferably Y is selected from the group consisting of a branched $C_3$ to $C_7$ alkyl, a moiety of the formula (II) and a moiety of the formula (III).

Preferably, Y is the same substituent in the formulae (Ia), (Ib) and (Ic).

The inventive mixture of isomeric aldimines of the formulae (Ia), (Ib) and (Ic) is preferably manufactured in a condensation reaction between a mixture of isomeric amines of the formula (IVa), (IVb) and (IVc), in which the ratio of the trans,trans isomer to the sum of the cis,trans isomer and the cis,cis isomer is in the range of 5/95 to 30/70, and at least one aldehyde of the formula (V).

(IVa)

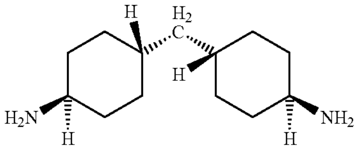

(IVb)

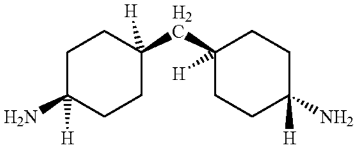

(IVc)

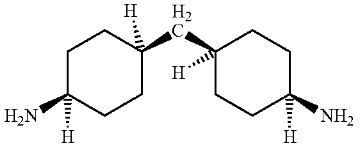

(V)

In the formula (V), Y has the already mentioned meanings.

The stoichiometric ratio between the aldehyde of the formula (V) and the amine groups of the mixture of isomeric amines of the formula (IVa), (IVb) and (IVc) is preferably at least 1, in order to convert all of the amine groups.

The condensation reaction is preferably conducted at a temperature in the range of 15 to 120° C., preferably 20 to 100° C. The water released by the condensation reaction is preferably removed from the reaction product, for example as an azeotrope with a suitable solvent, or preferably by distillation without a solvent.

The condensation reaction is preferably conducted without the presence of a solvent and the water is removed from the reaction product by vacuum distillation.

Such a reaction product can be used as inventive mixture of isomeric aldimines without further purification.

The mixture of isomeric amines of the formulae (IVa), (IVb) and (IVc) with a ratio of the trans,trans isomer to the sum of the cis,trans isomer and the cis,cis isomer in the range of 5/95 to 30/70 is preferably a grade of 4,4'-methylene-bis(cyclohexylamine) with a trans,trans isomer content in the range of 15 to 25%, which is liquid at room temperature and is commercially available, for example as Amicure® PACM or Vestamin® PACM (from Evonik) or Wanamine® $H_{12}$MDA (from Wanhua Chem.)

Preferred aldehydes of the formula (V) are isobutyraldehyde, 2-ethylhexanal, 2,2dimethyl-3-di(methoxyethyl)aminopropanal, 2,2-dimethyl-3-(N-2,6-dimethylmorpholino) propanal, 2,2-dimethyl-3-(N-morpholino)propanal, 2,2-dimethyl-3-acetoxypropanal or 2,2-dimethyl-3-lauroyloxypropanal.

Particularly preferred are aldehydes selected from the group consisting of isobutyraldehyde, 2,2-dimethyl-3-(N-morpholino)propanal, 2,2-dimethyl-3-(N-(2,6-dimethyl) morpholino)propanal, 2,2-dimethyl-3-acetoxypropanal and 2,2-dimethyl-3lauroyloxypropanal. Most preferred is 2,2-dimethyl-3-(N-morpholino)propanal.

Particularly preferred is an inventive mixture of isomeric aldimines selected from the group consisting of N,N'-bis (isobutylidene)-4,4'-methylene-bis(cyclohexylamine), N,N'-bis(2,2-dimethyl-3-(N-morpholino)propylidene)-4,4'-methylene-bis(cyclohexylamine), N,N'-bis(2,2-dimethyl-3-(N-(2,6-dimethyl)morpholino)propylidene)-4,4'-methylene-bis (cyclohexylamine), N,N'-bis(2,2-dimethyl-3-acetoxy-propylidene)-4,4'-methylene-bis(cyclohexylamine) and N,N'-bis(2,2-dimethyl-3-lauroyloxypropylidene)-4,4'-methylene-bis(cyclohexylamine). Most preferred is N,N'-bis-(2, 2-dimethyl-3-(N-morpholino)propylidene)-4,4'-methylene-bis(cyclohexylamine).

The inventive mixture of isomeric aldimines may contain small amounts of aldimines of the formula (VI), (VI)

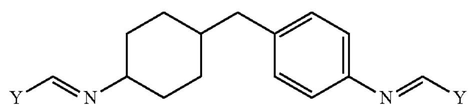

wherein Y has the already mentioned meanings.

The inventive mixture of isomeric aldimines may also contain portions of the corresponding 2,4'- and/or 2,2'-isomers, in particular the 2,4'-isomer of the formula

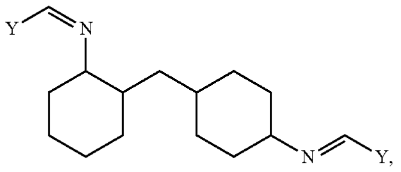

wherein Y has the already mentioned meanings. Preferably, the ratio of the sum of the 2,4'- and the 2,2'-isomers to the inventive mixture of isomeric aldimines (i.e. the 4,4'-isomers) is below 20/80, in particular not more than 10/90. In a preferred embodiment it is in the range of 0/100 to 2/98. In a further, particularly preferred embodiment it is in the range of 5/95 to 10/90.

A further subject of the invention is the use of the inventive mixture of isomeric aldimines of the formulae (Ia), (Ib) and (Ic) as latent hardener for moisture-curing polyurethane compositions.

Such moisture-curing polyurethane compositions preferably contain polyisocyanates and/or isocyanate-functional polymers, preferably based on commercial monomeric diisocyanates such as diphenylmethane diisocyanate (MDI), particularly 4,4'-diphenylmethane diisocyanate optionally containing some 2,4'- and/or 2,2'-diphenylmethane diisocyanate, toluene diisocyanate (TDI), preferably 2,4toluene diisocyanate optionally containing some 2,6-toluene diisocyanate, 1,4phenylene diisocyanate (PDI), naphthalene-1,5-diisocyanate (NDI), 1,6-hexane diisocyanate (HDI), 2,2(4),4-trimethyl-1,6-hexamethylene diisocyanate (TMDI), cyclohexane-1,3- or -1,4-diisocyanate, isophorone diisocyanate (IPDI), methyldiisocyanatocyclohexane ($H_6$TDI or HTDI), perhydro-4,4'-diphenylmethane diisocyanate ($H_{12}$MDI or HMDI), 1,3- or 1,4-bis(isocyanatomethyl)cyclohexane, m- or p-xylene diisocyanate (XDI) or m-tetramethylxylene diisocyanate (TMXDI). Preferred thereof are MDI, TDI, HDI or IPDI.

MDI or TDI are particularly preferred in combination with an inventive mixture of isomeric aldimines, wherein Y is a moiety of the formula (II).

IPDI is particularly preferred in combination with an inventive mixture of isomeric aldimines, wherein Y is a moiety of the formula (III) or a branched $C_3$ to $C_7$ alkyl.

Preferably, the inventive mixture of isomeric aldimines of the formulae (Ia), (Ib) and (Ic) is used in combination with at least one further aldimine of the formula (VII), (VII)

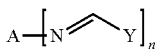

wherein n is 2 or 3,

A is the residue of a di- or triamine after the removal of the amine groups, wherein the di- or triamine is selected from the group consisting of hexane-1,6-diamine, 2methylpentane-1,5-diamine, 3-aminomethyl-3,5,5-trimethylcyclohexylamine (isophoronediamine), 4(2)-methylcyclohexane-1,3-diamine, 1,3-bis(aminomethyl)cyclohexane, 1,4-bis(aminomethyl)cyclohexane, 1,3-bis(aminomethyl)benzene, 1,2-diaminocyclohexane, polyoxypropylene diamines with an average molecular weight $M_n$ in the range of 200 to 4,000 g/mol and polyoxypropylene triamines with an average molecular weight $M_n$ in the range of 380 to 5,000 g/mol, and Y has the already mentioned meanings.

Preferably, Y is the same substituent in the formulae (Ia), (Ib) and (Ic) and in the formula (VII).

Particularly preferred is a combination with an aldimine of the formula (VII) wherein A is the residue of 3-aminomethyl-3,5,5-trimethylcyclohexylamine after the removal of the amine groups, and Y is isopropyl in the formulae (Ia), (Ib), (Ic) and (VII). Such a mixture is particularly preferred for the use in a primer, a paints or a varnish.

Further particularly preferred is a combination with an aldimine of the formula (VII) wherein A is the residue of 3-aminomethyl-3,5,5-trimethylcyclohexylamine after the removal of the amine groups, and Y is a moiety of the formula (III) in the formulae (Ia), (Ib), (Ic) and (VII), preferably wherein $R^1$ and $R^2$ are both methyl and $R^3$ and $R^4$ are joined together to form a 3-oxa-1,5-pentylen group. Such a mixture is particularly preferred for the use in an elastic adhesive, elastic sealant or elastic coating, which is particularly based on isophorone diisocyanate.

Preferably, the weight ratio between the inventive mixture of isomeric aldimines of the formulae (Ia), (Ib) and (Ic) and the aldimine of the formula (VII) is in the range of 10/90 to 80/20, preferably 20/80 to 75/25, more preferably 30/70 to 70/30, most preferably 40/60 to 60/40. Such a mixture can be used as a latent hardener of particularly low viscosity and low solidification temperature and enables cost-effective moisture-curing polyurethane compositions of high tensile strength and/or modulus of elasticity, markably higher than with the aldimine of the formula (VII) alone.

A further subject of the invention is a moisture-curing polyurethane composition comprising at least one polyisocyanate and/or isocyanate-functional polymer obtained from the reaction of at least one monomeric diisocyanate and at least one polyol, and an inventive mixture of isomeric aldimines of the formulae (Ia), (Ib) and (Ic).

Preferably, the polyisocyanate is an oligomeric or polymeric derivative of at least one monomeric diisocyanate, preferably selected from the group consisting of MDI, TDI, HDI and IPDI.

Preferred thereof are carbodiimides or uretonimines of MDI, polymeric MDI, oligomeric TDI, biuretes or isocyanurates or uretdiones or iminooxadiazin diones or allophanates of HDI, isocyanurates of IPDI or mixed isocyanurates based on TDI and HDI.

The isocyanate-functional polymer obtained from the reaction of at least one monomeric diisocyanate and at least one polyol preferably has an NCO-content in the range of 1 to 10 weight-%, preferably 1.5 to 8 weight-%.

The isocyanate-functional polymer preferably has an average molecular weight $M_n$ in the range of 800 to 15,000 g/mol, preferably 1,000 to 12,000 g/mol.

The monomeric diisocyanate for the isocyanate-functional polymer is preferably selected from the group consisting of 4,4'-diphenylmethane diisocyanate, 2,4'diphenylmethane diisocyanate, 2,2'-diphenylmethane diisocyanate, 2,4-toluene diisocyanate, 2,6 toluene diisocyanate, 1,3-phenylene diisocyanate, 1,4-phenylene diisocyanate, 2,3,5,6-tetramethyl-1,4-diisocyanatobenzene, naphthalene-1,5-diisocyanate, 3,3'-dimethyl-4,4'-diisocyanatodiphenyl, 1,4-tetramethylene diisocyanate, 2-methylpentamethylene-1,5-diisocyanate, 1,6-hexamethylene diisocyanate (HDI), 2,2(4),4-trimethyl-1,6-hexamethylene diisocyanate, 1,10-decamethylene diisocyanate, 1,12-dodecamethylene diisocyanate, lysine diisocyanate, lysine ester diisocyanate, cyclohexane-1,3-diisocyanate, cyclohexane-1,4-diisocyanate, 1-methyl-2,4-diisocyanatocyclohexane, 1-methyl-2,6-diisocyanatocyclohexane, isophorone diisocyanate (IPDI), perhydro-4,4'-diphenylmethane diisocyanate 1,3-bis(isocyanatomethyl)cyclohexane, 1,4-bis-(isocyanatomethyl)cyclohexane, m-xylylene diisocyanate, p-xylylene diisocyanate, tetramethyl-1,3-xylylene diisocyanate, tetramethyl-1,3-xylylene diisocyanate, bis-(1-isocyanato-1-methylethyl)naphthalene and 3,6-bis-(9-isocyanatononyl)-4,5-di(1-heptenyl)cyclohexene (dimeryl diisocyanate).

Preferred thereof are diphenylmethane diisocyanate (MDI), particularly 4,4'diphenylmethane diisocyanate or mixtures thereof with 2,4'-diphenylmethane diisocyanate and/or 2,2'-diphenylmethane diisocyanate, TDI, particularly 2,4toluene diisocyanate or mixtures thereof with 2,6 toluene diisocyanate, HDI or IPDI.

Particularly preferred is IPDI. In such compositions, the inventive mixture of isomeric aldimines enables a fast curing to a non-tacky elastic material with particularly good mechanical properties, particularly in terms of tensile strength, elongation and/or modulus of elasticity.

The inventive mixture of isomeric aldimines is particularly useful in IPDI-based polyurethane compositions which have a content of monomeric isophorone diisocyanate of less than 0.2 weight-%, particularly less than 0.1 weight-%, of monomeric isophorone diisocyanates in relation to the total composition. Such low monomer containing IPDI-based polyurethane compositions, if prepared with other types of aldimines, let alone without aldimines, tend to cure slowly or insufficiently, leading to a tacky surface and low mechanical strength and durability. The inventive mixture of aldimines allows to largely overcome these shortcomings.

The polyol is preferably selected from the group consisting of polyether polyols, polyester polyols, polycarbonate polyols and polyacrylate polyols.

The isocyanate-functional polymer is preferably liquid at room temperature.

Preferred are isocyanate-functional polymers of low viscosity, preferably with a viscosity of less than 50 Pa·s, more preferably less than 30 Pa·s, particularly less than 20 Pa·s, measured by a cone-plate-viscometer with a cone diameter of 25 mm, cone angle of 1° at a cone-plate-distance of 0.05 mm and a shear rate of 10 $s^{-1}$ at 20° C.

The polyol is preferably a polyether polyol or a mixture of at least one polyether polyol and at least one further polyol selected from polyester polyols, polycarbonate polyols and polyacrylate polyols.

The polyether polyol preferably has repetitive units selected from 1,2-ethyleneoxy, 1,2-propyleneoxy, 1,3-propyleneoxy, 1,2-butyleneoxy and 1,4-butyleneoxy. Particularly preferred are 1,2-propyleneoxy units, optionally in combination with some 1,2-ethyleneoxy units at the end of the chains. Further particularly preferred are 1,4-butyleneoxy units.

Preferred are polyetherpolyols with a content of unsaturation below 0.02 mEq/g, preferably below 0.01 mEq/g.

Preferred are polyoxypropylene diols or triols, which optionally are ethyleneoxide-endcapped, with an OH-number in the range of 10 to 250 mg KOH/g, preferably 20 to 125 mg KOH/g.

The polyol preferably has an average OH-functionality in the range of 1.7 to 3.

Particularly preferred are polyoxypropylene diols, which optionally are ethyleneoxide-endcapped, with an average molecular weight $M_n$ in the range of 450 to 12,000 g/mol, preferably 1,000 to 6,000 g/mol.

Particularly preferred are further trimethylolpropane or glycerine started polyoxypropylene triols, which optionally are ethyleneoxide-endcapped, with an average molecular weight $M_n$ in the range of 3,000 to 8,000 g/mol.

Preferred are further poly(oxy-1,4-butylene) diols, particularly with an OH-number in the range of 50 to 180 mg KOH/g, particularly with an average molecular weight $M_n$ in the range of 650 to 2,000 g/mol.

A particularly preferred isocyanate-functional polymer has an NCO-content in the range of 5 to 6 weight-% and is obtained from a polyoxypropylene diol with an OH-number in the range of 110 to 115 mg KOH/g and an average molecular weight $M_n$ of approximately 1,000 g/mol.

Another particularly preferred isocyanate-functional polymer has an NCO-content in the range of 1.7 to 2 weight-% and is obtained from a polyoxypropylene diol with an OH-number in the range of 26 to 30 mg KOH/g and an average molecular weight $M_n$ of approximately 4,000 g/mol.

Another particularly preferred isocyanate-functional polymer has an NCO-content in the range of 1.7 to 2.5 weight-% and is obtained from a polyoxypropylene triol, which is optionally ethyleneoxide-endcapped, with an OH-number in the range of 26 to 37 mg KOH/g and an average molecular weight $M_n$ in the range of 4,500 to 6,000 g/mol.

Another particularly preferred isocyanate-functional polymer has an NCO-content in the range of 2.8 to 7.7 weight-% and is obtained from a poly(oxy-1,4-butylene) diol with an OH-number in the range of 55 to 175 mg KOH/g.

Preferably, the isocyanate-functional polymer has an NCO-content in the range of 1 to 10 weight-% and is obtained from at least one polyether polyol.

The isocyanate-functional polymer is preferably prepared by combining the least one monomeric diisocyanate and the at least one polyol in a molar NCO/OH ratio of at least 1.3 preferably at least 1.5, more preferably at least 1.8, in the absence of moisture at a temperature in the range of 20 to 160° C., preferably 40 to 140° C., optionally in the presence of a suitable catalyst.

A particularly preferred isocyanate-functional polymer has a content of monomeric diisocyanate of below 0.5 weight-%, preferably below 0.3 weight-%, more preferably below 0.2 weight-%, in relation to the total polymer. Such a low monomer isocyanate-functional polymer allows to formulate curable compositions which have an overall content of monomeric diisocyanates of below 0.1 weight-%-in relation to the total composition, which are safe to use without special protective measures and do not require hazard labeling.

For such a polymer, the reaction is preferably conducted at a molar NCO/OH ratio of at least 3/1, followed by the removal of most of the remaining monomeric diisocyanate by a distillation process.

Preferably, the molar NCO/OH ratio is in the range of 3/1 to 10/1, preferably 3/1 to 8/1.

After the reaction, the remaining monomeric diisocyanate is removed from the reaction mixture with a distillation process, preferably by thin film distillation or short path distillation, preferably under vacuum.

Particularly preferred is a multi step process, in which the monomeric diisocyanate is removed in a short path evaporator at a jacket temperature in the range of 120 to 200° C., preferably 140 to 180° C., at a pressure of 0.001 to 0.5 mbar. Preferably, the reaction between the monomeric diisocyanate and the polyol as well as the removal of the remaining monomeric diisocyanate is conducted in the absence of a solvent or entrainer.

A preferred isocyanate-functional polymer with such a low monomer content is based on isophorone diisocyanate.

Particularly preferred is a low monomer isocyanate-functional polymer with a content of monomeric isophorone diisocyanate of below 0.3 weight-%, preferably below 0.2 weight-%, and an NCO-content in the range of 1 to 8 weight-% in relation to the total composition, wherein the polymer is obtained from the reaction of isophorone diisocyanate and at least one polyether polyol with an OH-number in the range of 13 to 180 mg KOH/g in a molar NCO/OH-ratio in the range of 3/1 to 10/1, followed by removing most of the monomeric isophorone diisocyanate by a distillation process.

The polyurethane composition may contain one or more than one isocyanate-functional polymers, particularly one or more polymers of the preferred embodiments.

The moisture-curing polyurethane composition preferably contains an amount of monomeric diisocyanates of below 0.1 weight-% in relation to the total composition. Such a composition enables a safe use for the applicator without special protective measures and without hazard labeling.

Preferably, the polyurethane composition contains at least one further ingredient selected from the group consisting of latent hardeners different from aldimines of the formula (I), oligomeric polyisocyanates, fillers, plasticizers, catalysts and stabilizers.

Preferred such latent hardeners are oxazolidines, bis-oxazolidines or aldimines different from the inventive mixture of isomeric aldimines.

Preferred aldimines different from aldimines of the formula (I) are aldimines of the formula (VII).

Preferably, Y is the same substituent in the formulae (Ia), (Ib) and (Ic) and in the formula (VII).

The polyurethane composition preferably further contains at least one aldimine of the formula (VIIa), (VIIa)

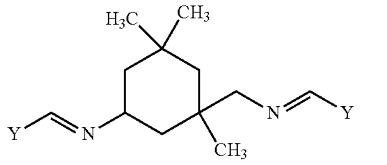

wherein Y has the already mentioned meanings. This aldimine is obtained from isophorone diamine and enables particularly cost-effective compositions with low viscosity and good mechanical properties.

Preferably, the weight ratio between the inventive mixture of isomeric aldimines of the formulae (Ia), (Ib) and (Ic) and the aldimine of the formula (VIIa) is in the range of 10/90 to 80/20, preferably 20/80 to 75/25. Such a composition shows an improved mechanical strength in comparison to the use of an aldimine of the formula (VIIa) alone.

The polyurethane composition preferably further contains at least one aldimine of the formula (VIIb), (VIIb)

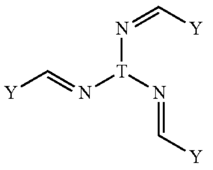

wherein T is the trifunctional moiety remaining when removing the primary amino groups of a polyoxypropylene triamine with an average molecular weight $M_n$ in the range of 380 to 500 g/mol, commercially available e.g. as Jeffamine® T-403 (from Huntsman), and Y has the already mentioned meanings.

Preferably, the weight ratio between the inventive mixture of isomeric aldimines of the formulae (Ia), (Ib) and (Ic) and the aldimine of the formula (VIIb) is in the range of 30/70 to 80/20, preferably 40/60 to 70/30.

In a particularly preferred embodiment of the invention, the composition contains at least one aldimine of the formula (VIIa) and at least one aldimine of the formula (VIIb). Preferably, the weight ratio between the inventive mixture of isomeric aldimines of the formulae (Ia), (Ib) and (Ic), the aldimine of the formula (VIIa) and the aldimine of the formula (VIIb) is in the range of 15-45/20-50/20-50, wherein the sum of the three figures equals 100.

The polyurethane composition preferably further contains at least one oligomeric diisocyanate, preferably an oligomer of HDI and/or IPDI, particularly an isocyanurate of isophorone diisocyanate. Such an oligomeric diisocyanate can help to achieve a high strength. However, its use is limited to a certain extent, as it can cause a dramatic increase of stiffness with reduction of elongation up to total brittleness when used in a too high amount.

Suitable fillers are ground or precipitated calcium carbonates (chalk), which are optionally surface coated with a fatty acid such as stearate, barium sulfate (barytes), slate, silicates (quartz), magnesiosilicates (talc) or alumosilicates (clay, kaolin), dolomite, mica, glass bubbles, silicic acid, particularly highly dispersed silicic acids from pyrolytic processes (fumed silica), carbon black, microspheres, pigments, particularly titanium dioxide or iron oxides, or flame-retarding fillers such as aluminium hydroxides, particularly aluminium trihydroxide (ATH), magnesium dihydroxide, antimony trioxide, antimony pentoxide, boric acid, zinc borate, zinc phosphate, melamine borate, melamine cyanurate, ethylenediamine phosphate, ammonium polyphosphate, di-melamine orthophosphate, di-melamine pyrophosphate, hexabromocyclododecane, decabromodiphenyl oxide and tris(bromoneopentyl) phosphate.

Preferred fillers are chalk, barytes, fumed silica and/or ATH.

Suitable plasticizers are phthalates, particularly diisononyl phthalate (DINP) or diisodecyl phthalate (DIDP), hydrogenated phthalates, particularly hydrogenated DINP, which is diisononyl-1,2-cyclohexane dicarboxylate (DINCH), terephthalates, particularly bis(2-ethylhexyl) terephthalate or diisononyl terephthalate, hydrogenated terephthalates, particularly bis(2-ethylhexyl)-1,4-cyclohexane dicarboxylate, trimellitates, adipates, particularly dioctyl adipate (DOA), azelates, sebacates, citrates, benzoates, glycol ethers, glycol esters, organic sulfonates or phosphates, particularly diphenylcresyl phosphate (DPK), polybutenes, polyisobutenes or plasticizers obtained from natural fats or oils such as epoxidized soy or linseed oil.

Suitable catalysts for the acceleration of aldimine hydrolysis are acid catalysts, particularly carboxylic acids or sulfonic acids, preferably aromatic carboxylic acids such as benzoic acid or salicylic acid.

Suitable catalysts for the acceleration of the reaction of isocyanate groups are metal catalysts, preferably dialkyltin complexes, in particular dibutyltin or dioctyltin carboxylates or acetoacetonates such as dibutyltindilaurate (DBTDL), $DBT(acac)_2$ or DOTDL, or amine catalysts, preferably tertiary aminoethers, in particular 2,2'dimorpholinodiethylether (DMDEE).

Preferred stabilizers are UV stabilizers and or heat stabilizers, particularly UV absorbers such as 2-cyano-3,3-diphenylacrylic acid ethyl ester, or hindered amine light stabilisers (HALS), such as bis(1,2,2,6,6-pentamethyl-4-piperidyl) sebacate.

The polyurethane composition may further contain the following ingredients:

- other isocyanate-functional polyurethane polymers;
- isocyanate-functional compounds obtained from small diols such as 1,2-ethanediol, 1,3-propanediol, 1,4-butanediol, 1,5-pentanediol, 3-methyl-1,5-pentanediol, 1,6-hexanediol, neopentyl glycol or diethylene glycol, particularly from 1,4butanediol;
- organic solvents, particularly acetone, methyl ethyl ketone, methyl n-propyl ketone, diisobutyl ketone, methyl isobutyl ketone, methyl n-amyl ketone, methyl isoamyl ketone, acetyl acetone, mesityloxide, cyclohexanone, methylcyclohexanone, methyl acetate, ethyl acetate, propyl acetate, butyl acetate, tert.butyl acetate, 1-methoxy-2-propylacetate, n-butyl propionate, ethyl-3-ethoxy propionate, diethyl malonate, diisopropyl ether, dibutyl ether, ethylene glycol diethylether, ethylene glycol monopropylether, ethylene glycol mono-2-ethylhexylether, diethylene glycol diethylether, propylal, butylal, 2-ethylhexylal, dioxolane, glycerolformal, 2,5,7,10-tetraoxaundecane (TOU), toluene, xylenes, heptanes, octanes, diisopropylnaphthalenes, petroleum fractions such as naphtha, white spirits or petroleum ethers such as Solvesso™ solvents (from Exxon), hydrogenated naphtha, methylene chloride, propylene carbonate, dimethyl carbonate, butyrolactone, N-methyl-pyrrolidone, N-ethyl-pyrrolidone, p-chlorobenzotrifluoride or benzotrifluoride;

fibres, particularly glass fibres, carbon fibres, metallic fibres, ceramic fibres, plastic fibres, particularly polyamide fibres or polyethylene fibres, or natural fibres such as wool, cellulose, hemp or sisal;

nanofillers such as graphene or carbon nanotubes;

dyes;

drying agents, particularly molecular sieves, calcium oxide, highly reactive isocyanates such as p-tosylisocyanate, mono-oxazolidines such as Incozol® 2 (from Incorez) or orthoformic acid ester;

adhesion promoters, particularly organoalkoxy silanes such as 3-glycidoxypropyltrimethoxysilane, 3-glycidoxypropyltriethoxysilane, (meth)acrylosilanes, anhydridosilanes, carbamatosilanes, alkylsilanes or iminosilanes, or oligomers thereof, or titanates;

thickeners, such as bentonites, derivates of castor oil, hydrogenated castor oil, polyam ides, polyamide waxes, polyurethanes, urea compounds, fumed silica, cellulose ethers or hydrophobically modified polyoxyethylenes;

natural resins, fats or oils such as rosin, shellac, linseed oil, castor oil or soybean oil;

non-reactive polymers, particularly homo- or copolymers of unsaturated monomers, particularly ethylene, propylene, butylene, isobutylene, isoprene, vinylacetate or alkyl(meth)acrylates, preferably polyethylene (PE), polypropylene (PP), polyisobutylene, ethylenevinyl acetate copolymers (EVA) or atactic poly-aolefins (APAO);

additives such as wetting agents, flow enhancers, leveling agents, defoamers, deaerating agents, stabilizers, antioxidants or biocides.

The composition preferably contains an amount of isocyanate-functional polymers in the range of 15 to 80 weight-%, particularly 20 to 50 weight-%, in relation to the total composition.

The composition preferably contains an amount of the inventive mixture of isomeric aldimines of the formulae (Ia), (Ib) and (Ic) in the range of 0.5 to 25 weight-%, preferably 1 to 20 weight-%, in relation to the total composition.

The composition preferably contains such an amount of aldimines, that the ratio between the total number of aldimine groups to the total number of isocyanate groups is in the range of 0.3 to 1, preferably 0.4 to 1, more preferably 0.5 to 1.

The composition preferably contains an amount of plasticizers in the range of 0 to 40 weight-%, preferably 10 to 30 weight-%, in relation to the total composition.

The composition preferably contains an amount of fillers in the range of 0 to 80 weight-%, preferably 20 to 60 weight-%, in relation to the total composition.

In a preferred embodiment of the invention, the composition further contains at least one flame-retarding ingredient, preferably a flame-retarding filler and/or a flame-retarding plasticizer. Such a composition is particularly preferred as coating for the waterproofing of buildings, particularly on roofs.

A preferred flame-retarding filler is aluminium trihydroxide (ATH). A preferred flame-retarding plasticizer is diphenylcresyl phosphate (DPK).

A particularly preferred composition contains at least one trimer of 1,6-hexamethylene diisocyanate or isophorone diisocyanate and at least one aluminium trihydroxide filler. Such a composition is particularly preferred as coating for the waterproofing of buildings.

In one embodiment of the invention, the composition preferably contains a low amount of volatile organic solvents with a boiling point at atmospheric pressure of below 200° C. Preferably, it contains not more than 200 g volatile organic solvents with a boiling point at atmospheric pressure of below 200° C., more preferably not more than 150 g such organic solvents, per liter of the total composition. Such a composition is particularly suitable as coating, particularly for the waterproofing of buildings or as outdoor floor covering.

In a further embodiment of the invention, the composition contains preferably an even lower content of volatile organic solvents with a boiling point at atmospheric pressure of below 200° C., preferably less than 10 weight-%, more preferably less than 5 weight-%, most preferably less than 1 weight-% in relation to the total composition. Such a composition is particularly suitable as adhesive, joint filler or outdoor floor covering.

In a further embodiment of the invention, the composition contains a high amount of volatile organic solvents, preferably in the range of 20 to 98 weight-%, more preferably 30 to 80 weight-%, in relation to the total composition. Such a composition is particularly suitable as primer or coating, particularly a paint or a varnish. It particularly contains an inventive mixture of isomeric aldimines wherein Y is a branched $C_3$ to $C_7$ alkyl, preferably isopropyl. This enables a particularly fast curing.

The moisture-curing polyurethane composition is preferably formulated as a single-pack composition, prepared by mixing all ingredients under exclusion of moisture to obtain a macroscopically homogeneous fluid or paste and stored in a moisture-tight container at ambient temperatures. A suitable moisture-tight container consists preferably of an optionally coated metal or plastic. It is preferably a bucket, a barrel, a hobbock, a bag, a sausage, a cartridge, a can, a bottle or a tube. With suitable packaging and storage, the single-pack moisture-curing polyurethane composition shows a good shelf life stability.

The moisture-curing polyurethane composition can also be formulated as a two-pack composition, in which a hardener component and an isocyanate component are stored separated from each other in separate containers and are mixed shortly before or during the application. The isocyanate component contains all the ingredients with isocyanate groups and optionally further ingredients which are not reactive towards isocyanate groups, and the hardener component contains isocyanate-reactive ingredients and optionally further ingredients. Preferably, the hardener component contains polyols and/or chain extenders, and the isocyanate component contains polyisocyanates. The inventive mixture of isomeric aldimines can be part of the hardener and/or the isocyanate component; preferably it is part of the hardener component.

Suitable polyols are polyether polyols, preferably the already mentioned ones, polyester polyols, polycarbonate polyols, copolymers of polyether, polyester and/or polycarbonate polyols, poly(meth)acrylate polyols, polybutadiene-polyols, natural oil-based polyols or fatty acid- or dimer fatty acid-based polyols. Preferred chain extenders are 1,2-ethanediol, 1,3-propanediol, 1,4-butanediol, 1,5-pentanediol, 1,6-hexanediol, 1,3-cyclohexanedimethanol, 1,4-cyclohexanedimethanol or diethylene glycol.

The process of curing begins when the moisture-curing composition is applied and gets in contact with moisture, especially atmospheric moisture. Upon curing, the isocyanate groups react under the influence of moisture with the hydrolyzing aldimine groups. Further isocyanate groups, particularly the isocyanate groups which are present in excess to the aldimine groups, react with each other under the influence of moisture. As a result of these reactions, the composition cures to form an elastic material. In the course of the curing reaction, an aldehyde of the formula (V) is released.

Depending on its substituent Y, the aldehyde is volatile and may evaporate from the applied composition within a certain time, or it is of low volatility and partly or mostly remains in the cured composition.

Another subject of the invention is the cured composition, which is obtained from the moisture-curing polyurethane composition after its contact with moisture.

The moisture for the curing of the composition preferably is atmospheric moisture penetrating into the composition from the surrounding air via diffusion processes. Upon curing, first a thin skin of cured composition is formed at the surface of the applied composition, which continuously grows in thickness as the curing process proceeds, until all of the applied composition is cured. Additional moisture contributing to the curing process may come from the substrates, to which the composition is applied, and/or from a water-containing or water-releasing accelerator component, which is mixed into the composition before or during its application, or is sprayed or brushed onto the surface of the applied composition.

The moisture-curing polyurethane composition is preferably applied at ambient conditions, preferably in a temperature range of −10 to 50° C., more preferably −5 to 45° C., particularly 0 to 40° C.

The curing of the composition preferably also takes place at ambient conditions.

The moisture-curing polyurethane composition has a sufficient open time to allow precise positioning and large surface applications and a fast curing progress, whereby the composition soon becomes tack-free and shows a fast build-up of mechanical strength and elasticity.

"Open time" is the time period, within which the applied composition can be processed or reworked without any negative effect. It is over when the viscosity of the composition due to progressing curing has risen too much, at the latest when a skin is formed on the surface. The time period, until a skin is formed on the surface, is called "skin formation time" or "skinning time".

The moisture-curing polyurethane composition is preferably used as an elastic adhesive and/or sealant, as an elastic coating or as primer, paint or varnish.

As an elastic adhesive and/or sealant, the composition is particularly suitable for uses in the construction or manufacturing industry or in vehicle construction, particularly for parquet bonding, assembly or module bonding, or as joint or cavity sealing and caulking, for example for high rise façades or shipdecks, which are exposed to particularly high UV load.

As an elastic coating, the composition is particularly suitable to seal and protect buildings or parts of a building, such as a footbridge, a balcony, a terrace, a roof, particularly a flat or a slightly sloping roof, a roof garden, or in the inner parts of a building under ceramic tiles in wet rooms or kitchens, or in sumps, channels, shafts, silos, tanks or wastewater treatment plants.

It can also be used for repair purposes, particularly on damaged roof membranes, floor coverings or sprayed membranes.

As a primer, the composition typically contains an amount of volatile organic solvents of more than 50 weight-% and is preferably a one- or a two-pack composition. It is particularly suitable to pretreat a substrate, particularly in order to enhance its strength and adhesion to a next layer of coating, sealant or adhesive.

As a paint or varnish, the composition typically contains an amount of volatile organic solvents of more than 20 weight-% and is preferably a two-pack composition. It is particularly suitable to coat a substrate with a highly aesthetic, hard and tough, scratch-, abrasion- and chemically resistant finish.

The moisture-curing polyurethane composition may be formulated in such a way, that it has a pasty consistency with pseudoplastic properties. Such a composition is preferably applied from a cartridge, a barrel or a hobbock, for example in the form of a bead with a round or triangular cross-sectional area.

The moisture-curing polyurethane composition may further be formulated in such a way, that it has a fluid consistency with self-leveling properties, optionally with a slight thixotropy. Such a composition can be applied by spraying or pouring onto a flat or slightly sloped surface. To form an even coating, the composition can then optionally be spread to the desired layer thickness with a suitable tool, such as a squeegee, a toothed trowel, a spatula, a roller, a brush or a draw down bar. A layer thickness in the range of 0.5 to 3 mm, preferably 0.5 to 2 mm, is typically applied in one step.

Suitable substrates, onto which the composition is typically applied, are particularly

- concrete, lightweight concrete, mortar, cement, fiber cement, brick, adobe, tile, slate, gypsum, gypsum panels, or natural stone, such as granite or marble;
- glass or glass ceramic;
- repair or levelling compounds based on PCC (polymer modified cement) or ECC (epoxy modified cement);
- metals and alloys, such as aluminium, copper, iron, steel, nonferrous metals, including surface-finished metals and alloys, such as galvanized metals or chrome-plated metals;
- asphalt;
- bituminous felt;
- plastics, such as hard or soft PVC, polycarbonate, polystyrene, polyester, polyamide, PMMA, ABS, SAN, epoxide resins, phenolic resins, PUR, POM, TPO, PE, PP, EPM or EPDM, in untreated form or surface-treated by means of plasma, corona or flame;
- fibre reinforced plastics such as carbon fibre reinforced plastics, glass fibre reinforced plastics or sheet moulding compounds;
- timber or plywood, paper, cardboard, wood materials bonded with organic resins, resin-textile composites or so-called polymer composites;
- insulating foams, particularly out of EPS, XPS, PUR, PIR, rock wool, glass wool or foamed glass;
- coated substrates, such as varnished tiles, painted concrete, coated metals or varnished metal sheets.

These substrates are optionally pre-treated before the application of the composition, particularly by a physical and/or chemical cleaning process or by the application of an activator or primer.

It is possible to bond or seal two identical or two different substrates.

Another subject of the invention is an elastic coating, adhesive or sealant containing the cured composition as described before.

Another subject of the invention is a primer, a paint or a varnish containing the cured composition as described before.

An elastic adhesive or sealant is preferably used to make an elastic bond, preferably by a method comprising the steps of

- (i) applying the moisture-curing polyurethane composition
  - onto a first substrate and contacting the composition with a second substrate within the open time of the composition, or
  - onto a first and onto a second substrate and join the two substrates within the open time of the composition, or
  - between two substrates,
- (ii) followed by curing the composition by contact with moisture.

For this method, the composition preferably has a pasty consistency and a content of volatile organic solvents below 5 weight-%.

An elastic coating or sealant can further be used by a method to make an elastic coating and/or sealing, comprising the steps of

- (i) applying the moisture-curing polyurethane composition onto a substrate
- (ii) curing the composition by contact with moisture.

For this method, the composition preferably has a liquid, low viscous consistency.

In a preferred embodiment, the elastic coating is part of a floor system, particularly an outdoor floor system, preferably on a balcony, a terrace, a footbridge or a staircase.

In another preferred embodiment, the elastic coating is part of an elastic waterproofing system.

An elastic coating preferably contains a combination of at least one oligomeric polyisocyanate and an isocyanate-functional polymer with an NCO-functionality of not more than 2.

Another subject of the invention is a waterproofing and/or a floor system, comprising

- optionally a primer,
- optionally an undercoat, and
- one or more than one layer of the inventive moisture-curing polyurethane composition, optionally in combination with a fibre reinforcement mesh or broadcasted with decorative flakes or quartz sand.

The inventive moisture-curing polyurethane composition is thereby preferably applied by pouring it onto a substrate, which is optionally coated with a primer and/or an undercoat, followed by spreading it evenly to the desired layer thickness, typically in the range of 0.05 to 3 mm dry film thickness, particularly in the range of 0.1 to 1.5 mm dry film thickness, particularly with a squeegee, a toothed trowel, a spatula, a roller or a brush.

In the case of a waterproofing system, a fibre reinforcement mesh is preferably used in combination with the inventive moisture-curing polyurethane composition.

The fibre reinforcement mesh is preferably worked into a first layer of the inventive moisture-curing polyurethane composition as long as the composition is still liquid, preferably by incorporating it thoroughly into the liquid layer with a roller or a brush. After the curing of the composition with the incorporated fibre reinforcement mesh, a next layer of the inventive moisture-curing polyurethane composition is preferably applied, optionally followed by a top coat.

The fibre reinforcement mesh is preferably a non-woven glass fibre mesh. The fibre reinforcement mesh acts as a reinforcement for the waterproofing system to increase strength and durability. The randomly oriented fibres in a non-woven fibre mesh give a multidirectional strength to the coating while allowing the latter to remain highly elastic. It improves strength, tear resistance and puncture resistance. The non-woven glass fibre mesh shows a particularly easy handling and can easily align with any given surface topography. It is important that the liquid composition thoroughly wets and penetrates the mesh in order to fully incorporate the mesh into the coating.

In the case of a floor system, the inventive moisture-curing polyurethane composition can be used in combination with decorative flakes or quartz sand. Decorative flakes or quartz sand are preferably sprinkled into a still liquid undercoat, which is then overcoated with the inventive moisture-curing polyurethane composition as a top coat. Such a top coat is preferably free of filler and pigments and has a clear, transparent look.

As a result of the described uses, an article is obtained, which is bonded, sealed and/or coated with the inventive composition. This article is preferably a building or an infrastructure, or a part of these, preferably a bridge, a roof, a balcony, a terrace, a staircase or a façade, or it is an industrial good or a consumer good, or a part of these, particularly a window, a pipe, a household machine, a car, a bus, a truck, a rail vehicle, a ship, an airplane or a helicopter.

The moisture-curing polyurethane composition described herein has a number of advantages. It is easily applicable and cures quickly to form a material of high strength, which is preferably elastic. The cured material has excellent mechanical properties, especially a high tensile strength and high elongation at break, combined with a relatively high modulus of elasticity. It enables compositions with very low content of monomeric diisocyanates, which are safe for the user and the environment, and which are very stable against UV and water attack. The use of the mixture of isomeric aldimines according to the invention allows to exceed the properties of reference compositions containing other aldimines.

EXAMPLES

The following examples illustrate the present invention without being limiting. "Normal climate" means a temperature of 23±1° C. and a relative atmospheric moisture of 50±5% and is abbreviated with "NC".

Unless otherwise stated, chemicals were purchased from Sigma-Aldrich Chemie GmbH and used as received.

Used Amines:

- Vestamine® PACM: 4,4'-methylene-bis(cyclohexylamine), mixture of isomers containing approx. 20% of the trans,trans isomer, liquid at room temperature, solidification at approx. 15° C. (from Evonik)
- Dicykan®: 4,4'-methylene-bis(cyclohexylamine), mixture of isomers containing approx. 50% of the trans, trans isomer, solid at room temperature, solidification at approx. 38° C. (from BASF)

IPDA: 3-aminomethyl-3,5,5-trimethylcyclohexylamine (Vestamin® IPD from Evonik)

Jeffamine® T-403: polyoxypropylene triamine of average molecular weight of about 440 g/mol (from Huntsman)

Preparation of Aldimines:

The amine content (total content of free amino and aldimino groups) of the prepared aldimines was determined by titration (with 0.1N $HClO_4$ in acetic acid against cristal violet) and is given in mmol N/g.

The viscosity was measured with a thermostated cone-plate-viscometer Rheotec $RC_{30}$ (cone diameter 50 mm, cone angle 1°, cone-plate-distance 0.05 mm, shear rate 10 s-1).

Aldimine A1: Mixture of Isomeric N,N'-Bis(2,2-Dimethyl-3-(N-Morpholino)Propylidene)-4,4'-Methylene-Bis (Cyclohexylamine) with a Ratio of the Trans,Trans Isomer to the Sum of the Cis,Trans Isomer and the Cis,Cis Isomer of Approx. 20/80 210.4 g (1 mol) Vestamine® PACM were placed in a round bottom flask under nitrogen atmosphere. Then 359.5 g (2.1 mol) 2,2-dimethyl-3-(N-morpholino)propanal were added under good stirring, followed by removing the volatile contents at 80° C. and 10 mbar vacuum. The product obtained was a clear yellow liquid with a viscosity of 13.9 Pa·s at 20° C. and an amine content of 7.68 mmol N/g, corresponding to a calculated aldimine equivalent weight of approx. 267 g/Eq.

Aldimine A2: Mixture of Isomeric N, N'-Bis(Isobutylidene)-4,4'-Methylene-Bis(Cyclohexylamine) with a Ratio of The Trans,Trans Isomer to the Sum Of The Cis,Trans Isomer and the Cis,Cis Isomer of Approx. 20/80

42.1 g (0.20 mol) Vestamine® PACM were placed in a round bottom flask under nitrogen atmosphere. Then 30.3 g (0.42 mol) isobutyraldehyde were slowly added with a dropping funnel under cooling with a water bath and good stirring, followed by removing the volatile contents at 80° C. and 10 mbar vacuum. The product obtained was a clear colorless liquid with a viscosity of 138 mPa·s at 20° C. (83 mPa·s at 25° C.) and an amine content of 6.13 mmol N/g, corresponding to a calculated aldimine equivalent weight of approx. 163 g/Eq.

Aldimine A3: Mixture Of Isomeric N,N'-Bis(2,2-Dimethyl-3-Acetoxypropylidene)-4,4'-Methylene-Bis(Cyclohexylamine) with a Ratio of the Trans,Trans Isomer to the Sum of the Cis,Trans Isomer and the Cis,Cis Isomer of Approx. 20/80

42.1 g (0.20 mol) Vestamine® PACM were placed in a round bottom flask under nitrogen atmosphere. Then 60.6 g (0.42 mol) 2,2-dimethyl-3-acetoxypropanal were added under good stirring, followed by removing the volatile contents at 80° C. and mbar vacuum. The product obtained was a clear colorless liquid with a viscosity of 1.9 Pas at 20° C. and an amine content of 4.19 mmol N/g, corresponding to a calculated aldimine equivalent weight of approx. 239 g/Eq.

Aldimine A4: Mixture of Isomeric N,N'-Bis(2,2-Dimethyl-3-Lauroyloxypropylidene)-4,4'-Methylene-Bis(Cyclohexylamine) with a Ratio of the Trans,Trans Isomer to the Sum of the Cis,Trans Isomer and the Cis,Cis Isomer of Approx. 20/80

42.1 g (0.20 mol) Vestamine® PACM were placed in a round bottom flask under nitrogen atmosphere. Then 119.5 g (0.42 mol) 2,2-dimethyl-3-lauroyloxypropanal were added under good stirring, followed by removing the volatile contents at 80° C. and 10 mbar vacuum. The product obtained was a clear yellowish liquid with a viscosity of 468 mPa·s at 20° C. and an amine content of 2.59 mmol N/g, corresponding to a calculated aldimine equivalent weight of approx. 386 g/Eq.

Aldimine B1: Mixture of Isomeric N,N'-Bis(2,2-Dimethyl-3-(N-Morpholino)Propylidene)-4,4'-Methylene-Bis (Cyclohexylamine) with a Ratio of the Trans,Trans Isomer to the Sum of the Cis,Trans Isomer and the Cis,Cis Isomer of Approx. 50/50 210.4 g (1 mol) Dicykan® were melted at 60° C. and placed in a round bottom flask under nitrogen atmosphere. Then 359.5 g (2.1 mol) 2,2-dimethyl-3-(N-morpholino)propanal were added under good stirring, followed by removing the volatile contents at 80° C. and 10 mbar vacuum. The product obtained was a brownish liquid with a viscosity of 13.9 Pas at 20° C., which gradually solidified upon storage at room temperature, with an amine content of 7.68 mmol N/g, corresponding to a calculated aldimine equivalent weight of approx. 267 g/Eq.

Aldimine B2: Mixture of Isomeric N, N'-Bis(Isobutylidene)-4,4'-Methylene-Bis(Cyclohexylamine) with a Ratio of the Trans,Trans Isomer to the Sum of the Cis,Trans Isomer and the Cis,Cis Isomer of Approx. 50/50

42.1 g (0.20 mol) Dicykan® were melted at 60° C. and placed in a round bottom flask under nitrogen atmosphere. Then 30.3 g (0.42 mol) isobutyraldehyde were added with a dropping funnel under cooling with a water bath and good stirring, followed by removing the volatile contents at 80° C. and 10 mbar vacuum. The product obtained was a clear brownish liquid with a viscosity of 150 mPa·s at 20° C. (100 mPa·s at 25° C.), which gradually solidified upon storage at room temperature, with an amine content of 6.13 mmol N/g, corresponding to a calculated aldimine equivalent weight of approx. 163 g/Eq.

Aldimine B3: Mixture of Isomeric N,N'-Bis(2,2-Dimethyl-3-Acetoxypropylidene)-4,4'-Methylene-Bis(Cyclohexylamine) with a Ratio of the Trans,Trans Isomer to the Sum of the Cis,Trans Isomer and the Cis,Cis Isomer of Approx. 50/50 42.1 g (0.20 mol) Dicykan® were melted at 60° C. and placed in a round bottom flask under nitrogen atmosphere. Then 60.6 g (0.42 mol) 2,2-dimethyl-3-acetoxypropanal were added under good stirring, followed by removing the volatile contents at 80° C. and 10 mbar vacuum. The product obtained was a clear brownish liquid with a viscosity of 2.7 Pa·s at 20° C. and an amine content of 4.26 mmol N/g, corresponding to a calculated aldimine equivalent weight of approx. 235 g/Eq.

Aldimine B4: Mixture of Isomeric N,N'-Bis(2,2-Dimethyl-3-Lauroyloxypropylidene)-4,4'-Methylene-Bis(Cyclohexylamine) with a Ratio of the Trans,Trans Isomer to the Sum of the Cis,Trans Isomer and the Cis,Cis Isomer of Approx. 50/50 42.1 g (0.20 mol) Dicykan® were melted at 60° C. and placed in a round bottom flask under nitrogen atmosphere. Then 119.5 g (0.42 mol) 2,2-dimethyl-3-lauroyloxypropanal were added under good stirring, followed by removing the volatile contents at 80° C. and 10 mbar vacuum. The product obtained was a clear brownish liquid with a viscosity of 518 mPa·s at 20° C. and an amine content of 2.59 mmol N/g, corresponding to a calculated aldimine equivalent weight of approx. 386 g/Eq.

Aldimine B5: Mixture of Isomeric N,N'-Bis(Benzylidene)-4,4'-Methylene-Bis(Cyclohexylamine) with a Ratio of the Trans,Trans Isomer to the Sum Of The Cis,Trans Isomer and the Cis,Cis Isomer of Approx. 20/80

42.1 g (0.20 mol) Vestamine® PACM were placed in a round bottom flask under nitrogen atmosphere. Then 44.6 g (0.42 mol) benzaldehyde were added under good stirring, followed by removing the volatile contents at 80° C. and 10 mbar vacuum. The product obtained was a yellowish solid with an amine content of 5.02 mmol N/g, corresponding to a calculated aldimine equivalent weight of approx. 199 g/Eq. The solid product had a melting point above 80° C.

Aldimine B6: Mixture of Isomeric N,N'-Bis(Benzylidene)-4,4'-Methylene-Bis(Cyclohexylamine) with a Ratio of the Trans,Trans Isomer to the Sum Of The Cis,Trans Isomer and the Cis,Cis Isomer of Approx. 50/50

42.1 g (0.20 mol) Dicykan® were melted at 60° C. and placed in a round bottom flask under nitrogen atmosphere. Then 44.6 g (0.42 mol) benzaldehyde were added under good stirring, followed by removing the volatile contents at 80° C. and 10 mbar vacuum. The product obtained was a yellowish solid with an amine content of 5.03 mmol N/g, corresponding to a calculated aldimine equivalent weight of approx. 199 g/Eq. The solid product had a melting point above 100° C.

Aldimine D1: N,N'-Bis(2,2-Dimethyl-3-(N-Morpholino) Propylidene)-3-Aminomethyl-3,5,5-Trimethylcyclohexylamine 170.3 g (1 mol) IPDA were placed in a round bottom flask under nitrogen atmosphere. Then 359.5 g (2.1 mol) 2,2-dimethyl-3-(N-morpholino)propanal were added under good stirring, followed by removing the volatile contents at 80° C. and 10 mbar vacuum. The product obtained was a nearly colourless liquid with an amine content of 8.25 mmol N/g, corresponding to a calculated aldimine equivalent weight of approx. 247 g/Eq.

Aldimine D2: N,N',N"-tris(2,2-Dimethyl-3-(N-Morpholino)Propylidene) Polyoxypropylene Triamine 157.1 g (1 mol N) Jeffamine® T-403 were placed in a round bottom flask under nitrogen atmosphere. Then 179.8 g (1.05 mol) 2,2-dimethyl-3-(N-morpholino)propanal were added under good stirring, followed by removing the volatile contents at 80° C. and 10 mbar vacuum. The product obtained was a nearly colourless liquid with an amine content of 6.44 mmol N/g, corresponding to a calculated aldimine equivalent weight of approx. 320 g/Eq.

The Aldimines A1 to A4 are mixtures of isomeric aldimines according to the invention. The Aldimines B1 to B6 and D1 and D2 are for reference.

TABLE 1

Overview of the aldimines A1 to B6

| | Aldimine | | | | | | | | | |
|---|---|---|---|---|---|---|---|---|---|---|
| | A1 | B1 (Ref.) | A2 | B2 (Ref.) | A3 | B3 (Ref.) | A4 | B4 (Ref.) | B5 (Ref.) | B6 (Ref.) |
| aldehyd base | 2,2-dimethyl-3-(N-morpholino)propanal | | isobutyraldehyde | | 2,2-dimethyl-3-acetoxy-propanal | | 2,2-dimethyl-3-lauroyloxy-propanal | | benzaldehyde | |
| content of the trans, trans isomer approx. | 20% | 50% | 20% | 50% | 20% | 50% | 20% | 50% | 20% | 50% |
| viscosity 20° C. [Pa · s] | 13.9 | (13.3) solid | 0.138 | (0.150) solid | 1.9 | 2.7 | 0.468 | 0.518 | — solid | — solid |

Preparation of Isocyanate-Functional Polyurethane Polymers:

The content of monomeric diisocyanates was determined with HPLC (detection by photodiode array; 0.04 M sodium acetate/acetonitrile mobile phase) after derivatization with N-propyl-4-nitrobenzylamine.

The viscosity was measured with a thermostated cone-plate-viscometer Rheotec $RC_{30}$ (cone diameter 25 mm, cone angle 1°, cone-plate-distance 0.05 mm, shear rate 10 $s^{-1}$).

Polymer P1

590 g polyoxypropylene diol (Acclaim® 4200, OH-number 28.5 mg KOH/g, from Covestro), 1180 g ethyleneoxide-capped polyoxypropylene triol (Caradol® MD34-02, OH-number 35.0 mg KOH/g, from Shell) and 230 g isophorone diisocyanate (Vestanat® IPDI, from Evonik) were reacted at 80° C. according to known procedures. The polymer obtained had an NCO-content of 2.1 weight-%, a viscosity of 22.5 Pa·s at 20° C. and a content of monomeric isophorone diisocyanate of approx. 2 weight-%.

Polymer P2

780 g ethyleneoxide-capped polyoxypropylene triol (Desmophen® 5031 BT, OH-number 28.0 mg KOH/g, from Covestro) and 220 g isophorone diisocyanate (Vestanat® IPDI, from Evonik) were reacted at 80° C. according to known procedures to form a mixture with an NCO-content of 6.4 weight-% and a content of monomeric isophorone diisocyanate of approximately 12 weight-%. The volatile contents, particularly most of the monomeric isophorone diisocyanate, were then removed from the mixture in a short path evaporator by distillation (jacket temperature 160° C., 0.1 to 0.005 mbar). The polymer obtained had an NCO-content of 1.9 weight-%, a viscosity of 10 Pa·s at 20° C. and a content of monomeric isophorone diisocyanate of 0.02 weight-%.

Polymer P3:

818 g polyoxypropylene diol (Acclaim® 4200, OH-number 28.5 mg KOH/g, from Covestro) and 182 g isophorone diisocyanate (Vestanat® IPDI, from Evonik) were reacted at 80° C. according to known procedures to form a mixture with an NCO-content of 5.1 weight-% and a content of monomeric isophorone diisocyanate of approximately 9 weight-%. The volatile contents, particularly most of the monomeric isophorone diisocyanate, were then removed from the mixture in a short path evaporator by distillation (jacket temperature 160° C., 0.1 to 0.005 mbar). The polymer obtained had an NCO-content of 1.9 weight-%, a viscosity of 6.5 Pa·s at 20° C. and a content of monomeric isophorone diisocyanate of 0.03 weight-%.

Polymer P4:

600 g polyoxypropylene diol (Voranol® 1010 L, OH-number 112 mg KOH/g, from Dow) and 400 g isophorone diisocyanate (Vestanat® IPDI, from Evonik) were reacted at 80° C. according to known procedures to form a mixture with an NCO-content of 10 weight-% and a content of monomeric isophorone diisocyanate of approximately 13 weight-%. The volatile contents, particularly most of the monomeric isophorone diisocyanate, were then removed from the mixture in a short path evaporator by distillation (jacket temperature 160° C., 0.1 to 0.005 mbar). The polymer obtained had an NCO-content of 5.5 weight-%, a viscosity of 21.8 Pa·s at 20° C. and a content of monomeric isophorone diisocyanate of 0.03 weight-%.

Moisture-Curing Polyurethane Compositions:

Compositions C1 to C10:

Each composition was prepared by mixing the ingredients given in Table 2 in the given amounts (weight parts) in a centrifugal mixer (SpeedMixer™ DAC 150, FlackTek Inc.) under exclusion of moisture, and stored in a moisture-tight container. Solid Aldimines were melted at 60° C. before use.

The compositions were tested as follows:

The viscosity was measured with a thermostated cone-plate-viscometer Rheotec $RC_{30}$ (cone diameter 25 mm, cone angle 1°, cone-plate-distance 0.05 mm, shear rate 10 s-1) at 20° C. after storing the moisture-tight container in normal climate for one day ("1 d NC") and again after storing the moisture-tight container in an oven at 60° C. for 7 days ("7d 60° C."). A small increase is an indication for a good storage stability.

The skinning time (skin formation time) was determined in normal climate by applying a few grams of the composition in a layer thickness of approx. 2 mm on cardboard and gently touching its surface with an LDPE pipette from time to time, until the touching did not leave any polymer residues on the pipette.

The Shore A hardness was determined according to DIN 53505 with cylindrical samples of 20 mm diameter and a thickness of 5 mm which had been stored in normal climate for 7 days.

To determine the mechanical properties, the composition was poured onto a PTFE coated foil in a layer thickness of approx. 2 mm and stored in normal climate for 7 days, followed by punching dumbell shaped samples out of the cured film with a length of 75 mm at a bridge length of 30 mm and a bridge width of 4 mm. With the so prepared samples, the tensile strength, the elongation (at break) and the E-modulus 5% (from 0.5 to 5% elongation) were determined according to DIN EN 53504 at a crosshead speed of 200 mm/min. The cured films of all the compositions were homogeneous and bubble-free.

The test results are given in Table 2.

Reference examples are marked with "(Ref.)".

TABLE 2

Composition (in weight parts) and test results of the Compositions C1 to C10.

| | | Composition | | | | | |
|---|---|---|---|---|---|---|---|
| | | C1 | C2 (Ref.) | C3 | C4 (Ref.) | C5 | C6 (Ref.) |
| Polymer P1 | | 80.00 | 80.00 | — | — | — | — |
| Polymer P2 | | — | — | 80.00 | 80.00 | 80.00 | 80.00 |
| Aldimine | | A1 | B1 | A1 | B1 | A2 | B2 |
| | | 7.48 | 7.48 | 6.41 | 6.41 | 3.86 | 3.86 |
| SA-solution[1] | | 1.50 | 1.50 | 1.50 | 1.50 | 1.50 | 1.50 |
| DBTDL-solution[2] | | 0.50 | 0.50 | 0.50 | 0.50 | 0.50 | 0.50 |
| viscosity | 1 d NC | 17.2 | 17.3 | 12.5 | 12.3 | 85.0 | 112.0 |
| [Pa · s] | 7 d 60° C. | 23.0 | 21.5 | 17.2 | 15.6 | cured | cured |
| skinning time [min] | | 25 | 21 | 18 | 18 | 7 | 7 |
| tensile strength [MPa] | | 2.37 | 1.53 | 2.12 | 1.40 | 1.89 | 1.43 |
| elongation [%] | | 305 | 190 | 350 | 239 | 322 | 259 |
| E-modulus 5% [MPa] | | 1.87 | 1.89 | 1.45 | 1.49 | 1.41 | 1.38 |
| Shore A | | n.d. | n.d. | 39 | 40 | n.d. | n.d. |
| | | **Composition** | | | | | |
| | | **C7** | **C8 (Ref.)** | **C9** | **C10 (Ref.)** | | |
| Polymer P1 | | — | — | — | — | | |
| Polymer P2 | | 80.00 | 80.00 | 80.00 | 80.00 | | |
| Aldimine | | A3 | B3 | A4 | B4 | | |
| | | 5.71 | 5.71 | 9.26 | 9.26 | | |
| SA-solution[1] | | 1.50 | 1.50 | 1.50 | 1.50 | | |
| DBTDL-solution[2] | | 0.50 | 0.50 | 0.50 | 0.50 | | |
| viscosity | 1 d NC | 11.1 | 11.2 | 9.3 | 9.4 | | |
| [Pa · s] | 7 d 60° C. | 12.8 | 12.3 | 11.7 | 11.5 | | |
| skinning time [min] | | 44 | 44 | 39 | 39 | | |
| tensile strength [MPa] | | 1.57 | 1.57 | 1.75 | 1.62 | | |
| elongation [%] | | 237 | 236 | 304 | 291 | | |
| E-modulus 5% [MPa] | | 1.82 | 1.77 | 1.36 | 1.35 | | |
| Shore A | | 43 | 43 | 38 | 38 | | |

"(Ref.)" means "reference example"

"n.d." means "not determined"

[1] 5 weight-% salicylic acid in dioctyl phthalate

[2] 5 weight-% dibutyltindilaurate in diisodecylphthalate

Moisture-Curing Polyurethane Adhesives:

Compositions $C_{11}$ to $C_{14}$:

Each composition was prepared by mixing the ingredients given in Table 3 in the given amounts (weight parts) with a planetary mixer under vacuum and exclusion of moisture, followed by storing it in a moisture-tight container. The solid Aldimine B1 was melted at 60° C. before adding.

The thickening paste was prepared by placing 300 g diisodecyl phthalate and 48 g 4,4'-diphenylmethane diisocyanate (Desmodur® 44 MC L, from Covestro) in a vacuum mixer, heating the mixture to 40° C., followed by adding 27 g monobutyl amine dropwise under vigorous stirring. The resulting paste was further stirred under vacuum and cooling for one hour.

The compositions were tested as follows:

The skinning time (skin formation time) and the Shore A hardness were determined as described for composition $C_1$.

To determine the mechanical properties, each composition was pressed between two wax-coated transfer printing papers to form a film of 2 mm thickness and stored in normal climate. After removing the wax-coated papers, dumbell shaped samples were punched from the cured film and tested for tensile strength, elongation and the E-modulus 5% as described for composition $C_1$. The cured films of all the adhesives were homogeneous and bubble-free.

The test results are given in Table 3.

Reference examples are marked with "(Ref.)".

TABLE 3

Composition (in weight parts) and test results of the Compositions C11 to C14.

| | Composition | | | |
|---|---|---|---|---|
| | C11 | C12 | C13 (Ref.) | C14 (Ref.) |
| Polymer P2 | 27.5 | 27.5 | 27.5 | 27.5 |
| IPDI-isocyanurate[1] | 0.5 | 0.5 | 0.5 | 0.5 |
| diisodecyl phthalate | 4.0 | 4.0 | 4.0 | 4.0 |
| Aldimine | A1 2.9 | A1 0.6<br>D1 2.2 | B1 2.9 | D1 2.8 |
| thickening paste | 25.0 | 25.0 | 25.0 | 25.0 |
| chalk[2] | 33.6 | 33.7 | 33.6 | 33.7 |
| titanium dioxide | 6.0 | 6.0 | 6.0 | 6.0 |
| SA-solution[3] | 0.50 | 0.50 | 0.50 | 0.50 |
| skinning time | n.d.[4] | n.d.[4] | 40' | 55' |
| tensile strength [MPa] | 3.2 | 3.2 | 2.6 | 2.8 |
| elongation [%] | 640 | 675 | 585 | 780% |
| E-modulus 5% [MPa] | 4.9 | 3.6 | 3.0 | 2.2 |
| Shore A | 41 | 39 | 41 | 37 |

"(Ref.)" means "reference example"

[1]Vestanate ® T1890/100 (from Evonik), NCO-content 17.3 weight-%

[2]Omya ® BLH (from Omya)

[3]5 weight-% dibutyltin dilaurate in diisodecyl phthalate

[4]not determined

Moisture-Curing Polyurethane Coatings:

Compositions $C_{15}$ to $C_{17}$:

Each composition was prepared by mixing the ingredients given in Table 4 in the given amounts (weight parts) in the centrifugal mixer under exclusion of moisture and stored in a moisture-tight container. Prior to use, the solid Aldimine B1 was melted at 60° C., while salicylic acid was dissolved in 1-methoxy-2-propylacetate.

The compositions were tested as follows:

The viscosity was measured at a temperature of 20° C. with a Rotothinner type viscometer with the spherical spindle DV2011 at 500 rpm, a first time after storing the moisture-tight container in normal climate for one day ("1d NC"), and again after storing the moisture-tight container in an oven at 40° C. for 21 days ("21d 40° C."

Cure speed ("BK drying time") was determined at 20° C./45% relative humidity using a Beck-Koller drying time recorder according to ASTM D5895.

To determine the mechanical properties, a two-layer cured film was prepared for each coating. To prepare the film, a first layer of 800 μm thickness was applied with a draw down bar and left curing in normal climate (NC) for 24 h; then a second layer of 400 μm thickness was applied thereon at an angle of 90° and again left curing in NC for 24 h; the two-layer film was then placed in an oven at 60° C. for 72 h. After an additional 24 h in NC, bar shaped test items with a length of 100 mm and a width of 25 mm were punched from the film and the tensile strength, the elongation at break and Young's modulus were determined according to BS EN ISO 527-3 at a crosshead speed of 180 mm/min. The cured films of all the coatings were homogeneous and bubble-free.

The results are given in Table 4.

Reference examples are marked with "(Ref.)".

TABLE 4

Composition (in weight parts) and test results of the Compositions C15 to C17.

| | | Composition | | |
|---|---|---|---|---|
| | | C15 | C16 (Ref.) | C17 (Ref.) |
| Polymer P3 | | 21.72 | 21.72 | 21.72 |
| Polymer P4 | | 10.86 | 10.86 | 10.86 |
| IPDI-isocyanurate solution[1] | | 3.35 | 3.35 | 3.35 |
| Aldimine | | A1 2.26<br>D1 2.26<br>D2 3.01 | B1 2.26<br>D1 2.26<br>D2 3.01 | D1 4.40<br>D2 3.01 |
| 1-methoxy-2-propyl acetate | | 21.05 | 21.05 | 21.05 |
| aluminium trihydroxide filler | | 21.63 | 21.79 | 21.91 |
| titanium dioxide | | 4.93 | 4.93 | 4.93 |
| barytes | | 2.80 | 2.80 | 2.80 |
| fumed silica | | 2.02 | 2.02 | 2.02 |
| additives | | 3.87 | 3.87 | 3.87 |
| salicylic acid | | 0.08 | 0.08 | 0.08 |
| viscosity | 1 d NC | 14 | 14 | n.d.[3] |
| [Poise] | 21 d 40° C. | 21 | 22 | |
| BK drying time: | gel-time | 2 | 2 | 1.75 |
| [h] | skinning-time | 5 | 5 | 7.5 |
| | dry-time | 12 | 12 | 72 |
| tensile strength [MPa] | | 7.6 | 6.6 | 5.8 |
| elongation at break [%] | | 600 | 575 | 620 |
| Young's modulus [MPa] | | 25.2 | 19.2 | 19.2 |

"(Ref.)" means "reference example"

[1]Desmodur ® Z 4470SN (70 weight-% in solventnaphtha 100, NCO-content 12.0 weight-%, from Covestro)

[2] aluminium trihydroxide powder

[3]not determined

The invention claimed is:

1. Mixture of isomeric aldimines of the formulae (Ia), (Ib) and (Ic), (Ia)

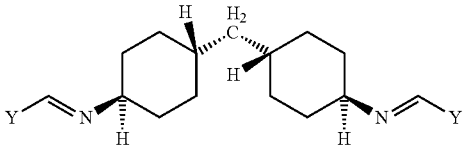

(Ib)

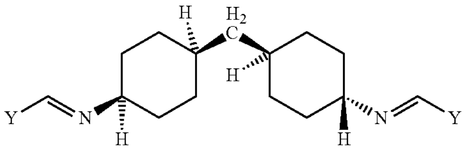

(Ic)

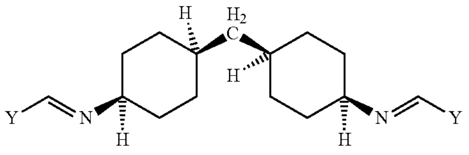

wherein the ratio of the trans, trans isomer (Ia) to the sum of the CIS, trans isomer (Ib) and the cis, cis isomer (Ic) is in the range of 5/95 to 30/70 wherein each Y is independently selected from the group consisting of:

a branched $C_3$ to $C_7$ alkyl, a moiety of the formula (II), (II)

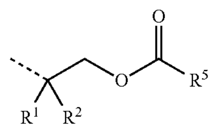

wherein $R^1$ and $R^2$ are the same or different $C_1$ to $C_4$ alkyls, or are joined together to form a $C_4$ to $C_6$ alkylene, and $R^5$ is H or a $C_1$ to $C_{17}$ alkyl optionally containing one or more ether groups, and a moiety of the formula (III), (III)

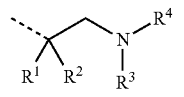

wherein $R^1$ and $R^2$ are the same or different $C_1$ to $C_4$ alkyls, or are joined together to form a $C_4$ to $C_6$ alkylene, and $R^3$ and $R^4$ are the same or different $C_1$ to $C_8$ alkyls optionally containing ether oxygen, or are joined together to form a $C_4$ to $C_6$ alkylene optionally containing ether oxygen.

2. The mixture of isomeric aldimines according to claim 1, wherein the ratio of the trans, trans isomer (la) to the sum of the cis, trans isomer (lb) and the cis, cis isomer (Ic) is in the range of 15/85 to 25/75.

3. The mixture of isomeric aldimines according to claim 1, wherein Y is a branched $C_3$ to $C_7$ alkyl.

4. The mixture of isomeric aldimines according to claim 1, wherein Y is a moiety of the formula (II), (II)

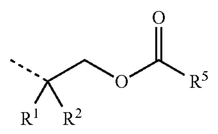

wherein $R^1$ and $R^2$ are the same or different $C_1$ to $C_4$ alkyls, or are joined together to form a $C_4$ to $C_6$ alkylene, and $R^5$ is H or a $C_1$ to $C_{17}$ alkyl optionally containing one or more ether groups.

5. The mixture of isomeric aldimines according to claim 1, wherein Y is a moiety of the formula (III), (III)

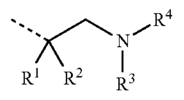

wherein $R^1$ and $R^2$ are the same or different $C_1$ to $C_4$ alkyls, or are joined together to form a $C_4$ to $C_6$ alkylene, and $R^3$ and $R^4$ are the same or different $C_1$ to $C_8$ alkyls optionally containing ether oxygen, or are joined together to form a $C_4$ to $C_6$ alkylene optionally containing ether oxygen.

6. The mixture of isomeric aldimines according to claim 5, wherein $R^1$ and $R^2$ are both methyl and $R^3$ and $R^4$ are joined together to form a 3-oxa-1,5-pentylen group, which is part of a morpholine ring.

7. A latent hardener for moisture-curing polyurethane compositions comprising the mixture of isomeric aldimines according to claim 1.

8. The latent hardener for moisture-curing polyurethane compositions according to claim 7, further comprising at least one further aldimine of the formula (VII), (VII)

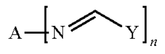

wherein n is 2 or 3,

A is the residue of a di- or triamine after the removal of the amine groups, wherein the di- or triamine is selected from the group consisting of hexane-1,6-diamine, 2-methylpentane-1,5-diamine, 3-aminomethyl-3,5,5-trimethylcyclohexylamine, 4 (2)-methylcyclohexane-1,3-diamine, 1,3-bis(aminomethyl) cyclohexane, 1,4-bis(aminomethyl) cyclohexane, 1,3-bis(aminomethyl) benzene, 1,2-diaminocyclohexane, polyoxypropylene diamines with an average molecular weight $M_n$ in the range of 200 to 4'000 g/mol and polyoxypropylene triamines with an average molecular weight $M_n$ in the range of 380 to 5'000 g/mol, and Y is the same substituent in the formulae (la), (lb) and (Ic) and in the formula (VII).

9. Moisture-curing polyurethane composition comprising at least one polyisocyanate and/or isocyanate-functional polymer obtained from the reaction of at least one monomeric diisocyanate and at least one polyol, and a mixture of isomeric aldimines according to claim 1.

10. The moisture-curing polyurethane composition according to claim 9, containing an isocyanate-functional polymer with an NCO-content in the range of 1 to 10 weight-% obtained from at least one polyether polyol.

11. The moisture-curing polyurethane composition according to claim 9, containing an amount of monomeric diisocyanates of below 0.1 weight-% in relation to the total composition.

12. A cured composition, obtained from the moisture-curing polyurethane composition according to claim 9 after its contact with moisture.

13. Elastic coating, adhesive or sealant containing the cured composition according to claim 12.

14. Primer, paint or varnish containing the cured composition according to claim 12.

* * * * *